(12) United States Patent
Cody et al.

(10) Patent No.: US 7,903,926 B2
(45) Date of Patent: Mar. 8, 2011

(54) ATTACHMENT STRUCTURE ALLOWING MOVEMENT AND PROTECTION OF A TETHER OF A CABLE ASSEMBLY

(75) Inventors: Joseph T. Cody, Hickory, NC (US); Stephen R. Horan, Jr., Hickory, NC (US); Radawan Hall, Granite Falls, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/545,259

(22) Filed: Aug. 21, 2009

(65) Prior Publication Data
US 2009/0310924 A1    Dec. 17, 2009

Related U.S. Application Data

(62) Division of application No. 12/080,279, filed on Apr. 2, 2008, now Pat. No. 7,596,291.

(51) Int. Cl.
*G02B 6/00* (2006.01)
*G02B 6/44* (2006.01)

(52) U.S. Cl. .......................... 385/137; 385/100

(58) Field of Classification Search .................. 385/100, 385/101, 134, 136, 137, 139, 147, 25, 26
See application file for complete search history.

(56) References Cited

U.S. PATENT DOCUMENTS

| | | | |
|---|---|---|---|
| 4,961,623 A | 10/1990 | Midkiff et al. | 350/96.2 |
| 7,127,143 B2 | 10/2006 | Elkins, II et al. | 385/100 |
| 7,289,714 B1 | 10/2007 | Wells | 385/135 |
| 7,317,863 B2 | 1/2008 | Lu et al. | 385/135 |
| 7,330,621 B2 | 2/2008 | Elkins, II et al. | 385/100 |
| 7,346,243 B2 | 3/2008 | Cody et al. | 385/100 |
| 7,403,685 B2 | 7/2008 | Wells | 385/100 |
| 7,418,177 B2 | 8/2008 | Lu et al. | 385/100 |
| 7,424,189 B2 | 9/2008 | Lu et al. | 385/100 |
| 2005/0129375 A1 | 6/2005 | Elkins et al. | 385/100 |
| 2005/0265672 A1* | 12/2005 | Theuerkorn et al. | 385/100 |
| 2007/0009214 A1 | 1/2007 | Elkins et al. | 385/100 |
| 2007/0047897 A1* | 3/2007 | Cooke et al. | 385/136 |
| 2008/0080830 A1 | 4/2008 | Lewallen et al. | 385/136 |
| 2008/0112675 A1 | 5/2008 | Lewallen et al. | 385/99 |

FOREIGN PATENT DOCUMENTS

| | | |
|---|---|---|
| JP | 2003-202427 | 7/2003 |
| WO | WO 2006/044080 A1 | 4/2006 |

* cited by examiner

*Primary Examiner* — Charlie Peng
*Assistant Examiner* — Mary A El-Shammaa (57) ABSTRACT

A cable assembly comprising a fiber optic cable and one or more attachment points to allow one or more tethers to optically connect to optical fibers within the cable. The cable assembly may be used as a drop cable for extending optical connections to a plurality of points. An attachment structure is provided for maintaining the tether to the cable to prevent damage to the tether. The attachment structure provides a loose attachment to allow the tether to move relative to the distribution cable, so the tether can move in a generally translational movement, is able to slightly twist, and to have limited lateral movement during coiling, installation, and removal of the cable assembly. This loose attachment structure may prevent damage to the tether due to forces being placed on the cable, such as during coiling or uncoiling of the cable. In one exemplary embodiment, the attachment structure is attached to the cable and receives the tether. In another exemplary embodiment, the attachment structure include a protective covering. In another embodiment, both are employed in combination.

20 Claims, 4 Drawing Sheets

ATTACHMENT STRUCTURE ALLOWING MOVEMENT AND PROTECTION OF A TETHER OF A CABLE ASSEMBLY

CROSS-REFERENCE TO RELATED APPLICATION

The present application is a Divisional of U.S. Ser. No. 12/080,279 filed on Apr. 2, 2008 now U.S. Pat. No. 7,596,291, the contents of which are relied upon and incorporated herein by reference in its entirety.

BACKGROUND OF THE INVENTION

1. Field of the Invention

The present invention relates generally to a fiber optic cable assembly having a distribution cable and one or more tethers optically connected to optical fibers in the distribution cable. An attachment structure is provided for maintaining the tether to the distribution cable such that the tether has a freedom of movement and is able to move relative to the distribution cable to prevent damage to the tether as the assembly is subjected to forces. In one embodiment, the attachment structure permitting movement of the tether in relation to the distribution cable, for example, the movement being a generally translational movement, a lateral movement, and limited rotation of the tether. The attachment structure may also protect a connectorized end of the tether.

2. Technical Background

Fiber optic cable assemblies are being developed to deliver services to subscribers for voice, video, and data services. In this regard, both indoor and outdoor cable assemblies are being developed in which a fiber optic distribution cable is accessed at a preterminated location along its length to access the optical fibers within. Pre-selected optical fibers are pre-terminated and spliced or otherwise optically connected to optical fibers of a drop or tether cable. The distribution cable in a buried, aerial, or duct application is used to provide a trunk or main run, while a tether cable may be used to provide a branch off of the main trunk. For example, the tether cable may provide a branch that supplies services to a floor of a multi-dwelling unit, or a branch to an apartment building. Tethers may have any desired length. The tethers are typically attached to the distribution cable at a network access point and lashed to the cable along their length so that they may be wound on a reel along with the distribution cable and readily installed. The lashing is done in a way that inhibits or even prevents movement. A tether may terminate in, for example, splice-ready optical fibers, connectorized fibers, or an optical connection terminal.

Because of significant forces applied to cable assemblies during installation or removal, for example, bending, torsion, and tensile forces, the cable assemblies can suffer damage as the assemblies are pulled forward and backward. In particular, attached tethers are especially vulnerable to such forces and are often unintentionally ripped or disengaged from the distribution cable to which they are attached. Further, the location of strength elements within the distribution cable, such as glass reinforced plastic or other polymer-based elements, creates a preferential bend, such that when the cable assembly is coiled up, forces are applied which tend to compel the tether to move relative to the distribution cable along a linearly constrained path. This causes problems when trying to firmly secure the tether to the distribution cable and leads to the tether lashings being fractured or otherwise ripped or torn apart, so that the tether is subject to damage. Moreover, any connector(s) attached to the end of the tether is subject to damage during the coiling, installation, or removal procedures. It would be desirable to provide a cable assembly structure that maintains the tether to the distribution cable while allowing translation between the tether and the distribution cable to prevent tether damage during installation as the cable assembly is subject to forces, and providing protection for optical connector(s) attached to the tethers.

SUMMARY OF THE INVENTION

One aspect of the present invention is a cable assembly comprising a fiber optic cable. The fiber optic cable may be a distribution cable wherein a plurality of optical fibers are contained within the cable. One or more attachment points may be provided for one or more tethers to optically connect to optical fibers within the fiber optic cable. An attachment structure is provided for loosely maintaining the tether to the fiber optic cable such that the tether is able to move, the movement being a generally translational movement, a lateral movement, and limited rotation of the tether relative to the fiber optic cable. In this manner, the tether can be maintained to the fiber optic cable to protect the tether from damage due to forces being placed on the cable assembly. By the attachment structure also allowing for example translational movement between the tether and the fiber optic cable, the tether can translate relative to the fiber optic cable to prevent damage in the event translation forces are placed on the tether.

Another aspect of the present invention is a method of manufacturing a cable assembly comprising a fiber optic cable having a tether optically connected to the fiber optic cable and an attachment structure for loosely maintaining the tether to the fiber optic cable. A sheath of the fiber optic cable is removed to access at least one optical fiber among a plurality of optical fibers within the section of the sheath removed from the fiber optic cable. The optical fiber accessed from the section of the sheath removed from the fiber optic cable is terminated. The terminated optical fiber is optically connected to an optical fiber disposed within a first end of a tether. The first end of the tether is encapsulated to the fiber optic cable to secure the first end of the tether to the fiber optic cable. An attachment structure is placed on the tether and fiber optic cable to maintain the tether to the fiber optic cable such that the tether is able to translate relative to the fiber optic cable.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description server to explain the principles and operation of the invention.

DETAILED DESCRIPTION OF THE PREFERRED EMBODIMENTS

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the embodiments described herein, the present invention provides a cable assembly comprising a fiber optic cable. The fiber optic cable may be a distribution cable wherein a plurality of optical fibers are contained within the cable. One or more attachment points may be provided for one or more tethers to optically connect to optical fibers within the fiber optic cable. In one embodiment of the invention, at least one attachment structure provides freedom of movement of the tether in relation to the fiber optic cable such that the tether is able to move, for example, in a generally translational movement, a limited lateral movement, and limited rotation or twisting of the tether. In this manner, the tether can be attached to the fiber optic cable and protect the tether from damage due to forces being placed on the cable assembly. By the attachment structure also allowing such movement between the tether and the fiber optic cable, the tether can translate relative to the fiber optic cable to prevent damage in the event forces are placed on the cable assembly and especially the tether during coiling, installation, and removal. In the embodiment, the attachment structure provides a protective covering for the end of at least one tether and an optical connector terminated to the tether end. The tether can be furcated or branched into several ends with optical fibers, all or some of which can be within the protective covering, including the optical connectors terminated to optical fibers.

The at least one tether may be attached at a first end at or adjacent to the network access point at which it is optically connected. The tether terminates at its second end, its "downstream end," in either for example splice ready optical fibers, connectorized optical fibers, or a network connection terminal. The tether may be furcated and branched to include individual or groups of optical fibers. Any optical connector attached to a tether can be covered by a protective dust cap, for example, including a pulling loop. A distribution cable of the present invention may include any suitable fiber optic cable including, but not limited to, a buffer tube containing cable or an optical ribbon fiber containing cable and combinations thereof. Specific cable types may include cables selected from the SST™ and RPX™ cable families available from Corning Cable Systems LLC of Hickory, N.C. The term "tether" cable as used herein is intended to include fiber optic drop cables, secondary distribution cables, furcation tubing, or other fiber optic cables. Generally, a tether will include a lesser optical fiber count than the distribution cable to which it is attached.

Figure 1:
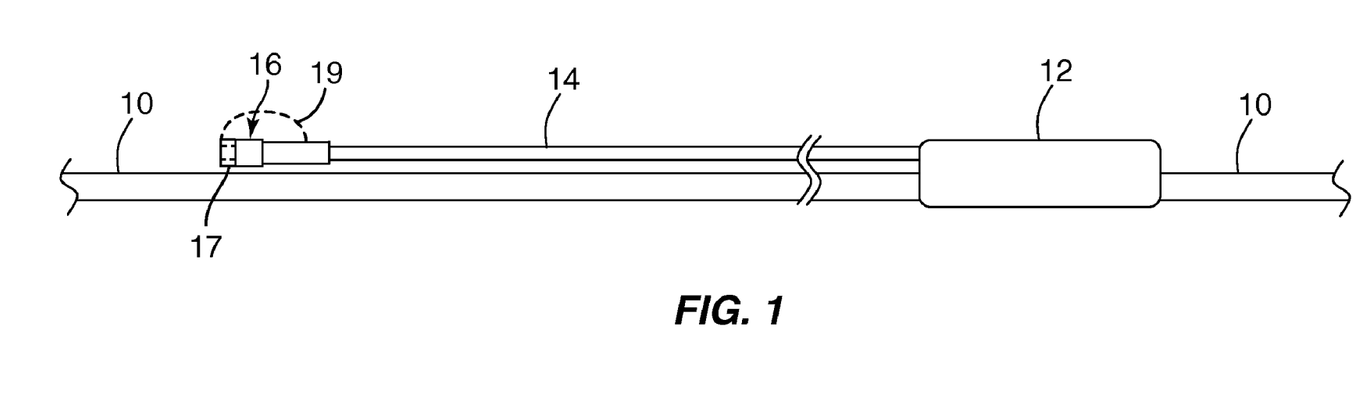
FIG. 1 is a schematic diagram of a basic cable assembly including a distribution cable, a network access point, and a connectorized tether.

Referring to FIG. 1, a basic, exemplary cable assembly used in embodiments of the present invention includes a distribution cable 10, a network access point 12, a tether 14, and an optical fiber connector 16 mounted upon the end of the tether 14. The distribution cable 10 may also be referred to as a fiber optic cable 10. The distribution cable 10 typically contains a plurality of optical fibers (not shown) within the cable 10. The network access point 12 is provided to serve as an access point for accessing pre-selected optical fibers within the cable 10. The pre-selected optical fibers within the cable 10 may be preterminated and exit the cable 10 through the network access point 12. Optical fibers contained within the tether 14 may be optically connected to the preterminated optical fibers to provide an optical connection between the pre-selected optical fibers and the tether 14. The tether 14 can then be routed or dropped and optically connected to another device proximate to the cable 10 to provide an optical connection between the device and optical fiber within the cable 10.

The network access point 12 is physically attached to the cable 10. This protects and provides support to the optic fibers exiting the cable 10 and contained within the network access point 12. The network access point 12 may be any length necessary or desired to support optical fibers exiting the cable 10 to be optically connected to the tether 14. In the disclosed embodiment, the network access point 12 is approximately one foot long and is made of an overmolded, flexible material disposed about the tether and the distribution cable including at least one connection between at least one optical fiber to the tether and at least one optical fiber of the distribution cable. Network access point overmolding is disclosed in U.S. Pat. Nos. 7,127,143, 7,266,274, and 7,228,036 which are respectively incorporated herein in their respective entireties. To further protect the network access point 12 and secure it to the cable 10, the network access point 12 can be bound to the cable 10. The network access point 12 can include a terminal closure with relatively hard plastic walls, or it can be physically bound by any binding material desired, including but not limited to tape, adhesive, wrapping, heat shrink, tie wrap, lashing, a clamp, an expandable material, a stretchable material, an elastic material, a combination thereof, or any other like device or structure. The tether 14 can also be physically attached at a first end at or adjacent to the network access point 12 to which the tether 14 is optically connected to provide support for the tether 14 and optical fibers contained inside the tether 14. The tether 14 can be physically bound to the network access point 12 by any binding material desired including but not limited to tape, adhesive, wrapping, heat shrink, tie wrap, lashing, a clamp, an expandable material, a stretchable material, an elastic material, a combination thereof, or any other like device or structure. The material used to physically bind the network access point 12 to the cable 10 can also be used to physically bind the tether 14 to the network access point 12 and can be part of the same binding. In the embodiment disclosed in FIG. 1, the same binding structure is used to physically bind both the network access point 12 to the cable 10 and the tether 14 to the network access point 12.

The tether 14 terminates at its second end, or its "downstream end," in either splice ready optical fibers, connectorized optical fibers, or a network connection terminal. In the embodiment illustrated in FIG. 1, the tether 14 terminates at its downstream end in an optical fiber connector 16. The downstream end of the tether 14 is also referred to herein as the "connectorized end." The optical fiber connector 16 can be a single or multi-fiber connector. In the illustration of FIG. 1, the optical fiber connector 16 is a multi-fiber connector, such as an OptiTip™ connector described in U.S. Pat. No. 7,264,402, which patent is incorporated by reference herein in its entirety. This connector is available from Corning Cable Systems LLC. The optical connector 16 can be covered by a protective dust cap 17 including a pulling loop 19 (shown in a dashed line) attaching the cap 17 to the connector 16 so that the protective dust cap 17 remains with the connector 16 when removed.

Further, as mentioned above, the network access point 12 can be flexible or constructed out of a flexible material. This allows the physical connection between the tether 14 and the network access point 12 to be flexible so that the tether 14 can move relative to the cable 10 to prevent damage to the tether 14. Also during installation, when the tether 14 is typically "dropped" to establish a drop connection to another device, this can require the tether 14 to be bent or flexed in a different direction from the fiber optic cable 10 to establish the drop connection. A flexible network access point 12 can more easily facilitate flexing or bending of the tether 14 relative to the cable 10.

Note that although the embodiment of FIG. 1 only shows one network access point 12 and optically connected tether 14, multiple network access points 12 can be provided at preselected locations along the cable 10 for optically connecting multiple tethers 14 to select optical fibers within the cable 10. The present invention is applicable for any number of network access points 12 and tethers 14 desired.

Figure 2:
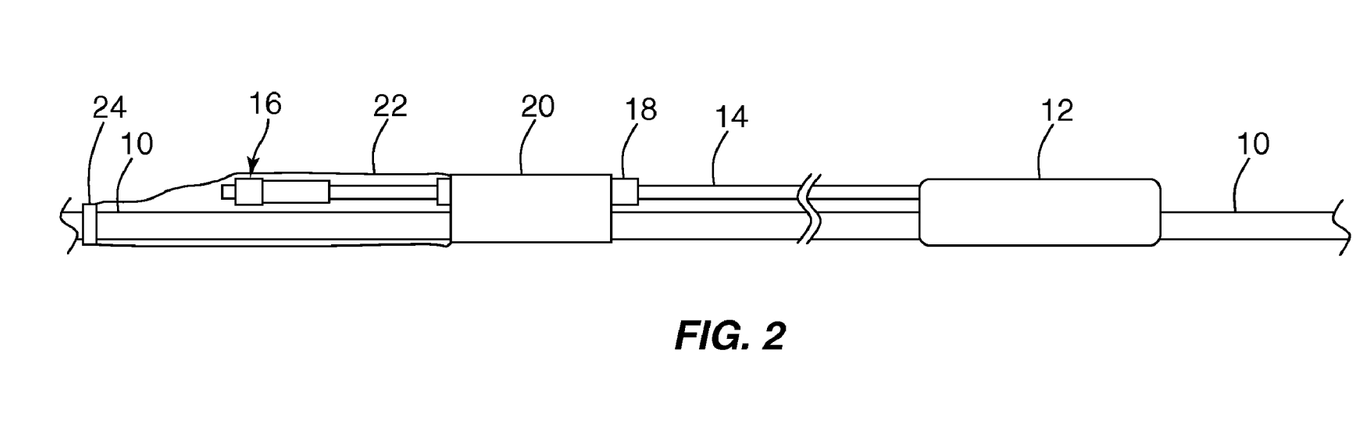
FIG. 2 is a schematic diagram of a portion of a cable assembly including attachment structure for loosely coupling a tether to a distribution cable to allow translation between the tether and the distribution cable, according to one embodiment of the present invention.

Referring to FIG. 2, the cable assembly of FIG. 1 is shown, but further includes an attachment structure for "loosely" or "moveably" attaching the tether 14 to the distribution cable 10. The attachment structure allows translation of the tether 14 relative to the distribution cable 10 as the assembly encounters forces, including but not limited to those encountered during installation. The terms "loosely" or "moveably" simply mean that the attachment of the tether 14 to the cable 10 is not firm where the tether 14 cannot translate or move relative to the cable 10. This "loose" or "moveable" attachment is such that the tether 14 can translate relative to the cable 10 while the tether 14 is maintained to the cable 10 to prevent damage to the tether 14.

In the specific embodiment shown in FIG. 2, the tether attachment structure includes a tubular component 18 for receiving a portion of the tether 14 therein. The tether 14 can be of any length. The tether 14 illustrated in the figures is between approximately four to five feet in length. The tubular component 18 can be of any length, but is shown as approximately three inches in length. The tether 14 is preferably received within the tubular component 18 such that the tether 14 is slidably received within the tubular component 18. Thus, the tether 14, being received within the tubular component 18, is secured to the fiber optic cable 10 to maintain the tether 14 to the cable 10 when the tubular component 18 is attached to the cable 10. The tubular component 18 can be attached to the cable 10 via any suitable securing device 20, which can include tape, adhesive, wrapping, heat shrink, tie wrap, lashing, a clamp, an expandable material, a stretchable material, an elastic material, a combination thereof, or any other like device or structure.

The tubular component 18 can include a length of tubing having an internal diameter greater than that of the cross-sectional diameter of the tether 14. In this manner, the tether 14 is loosely coupled inside the tubular component 18 such that the tether 14 can translate relative to the tubular component 18. Thus, the tether 14 can also translate relative to the fiber optic cable 10. The tubular component 18 can have a length of several inches. Further, the tubular component 18 can be constructed out of any material including but not limited to plastic, nylon, urethane, or other polymer-based material, metal, aluminum, ceramic, or a combination thereof, or other device or structure. It can be desirable to smooth, grind, or manufacture out any sharp edges of the tubular component 18 to prevent the tubular component 18 from cutting the outer coating of the distribution cable 10 during any translation of tether 14.

The attachment structure can also be provided in the form of a protective covering 22. An exemplary protective covering 22 is shown in FIG. 2. The protective covering 22 can be used in lieu or in addition to other attachment structures, including the tubular component 18. In this example, the optical connector 16 of the tether 14 and a portion of the distribution cable 10 are covered with the protective covering 22. The protective covering 22 is secured at fixed attachment points to the fiber optic cable 10, with one end or a first end being attached to the securing device 20 and the other or second end by another securing device 24 similar to device 20. The securing devices 20, 24 that attach the protective covering 22 on its ends to the cable 10 can include a wrap, tape, heat shrink, lashing, a clamp, a combination thereof, or any like device or devices as previously described for the securing device 20 securing the tubular component 18 to the cable 10. In an alternative embodiment, the protective covering 22 can be secured to the tether 14 and the distribution cable 10.

The protective covering 22 in FIG. 2 is shown transparent in order to illustrate the underlying components. A pulling loop 19 can be included, but is not shown in FIG. 2 to not obfuscate illustrating the protective covering 22. The protective covering 22 also provides a "loose" or "movable" connection between the tether 14 and the cable 10 to allow the tether 14 to translate in relation to the cable 10. The protective covering 22 can include or be made out of any material, including but not limited to a solid or woven plastic, nylon, urethane, other polymer-based material, cloth type material, expandable material, permeable material, flexible material, stretchable material, resilient material, a combination thereof, or the like. Such material can be expandable or have elastic properties to facilitate translation. Suitable coverings can include a mesh which can be a particularly suited form when the protective covering 22 is constructed out of plastic, nylon, or other polymer-based material. Plastic, nylon, or other polymer-based materials can be desirable, because they hold up well to outdoor or non-ideal conditions to which the cable 10 and tether 14 can be exposed during manufacture, storage, and/or installation. The mesh sealing performance can range from breathable to watertight.

Figure 3:
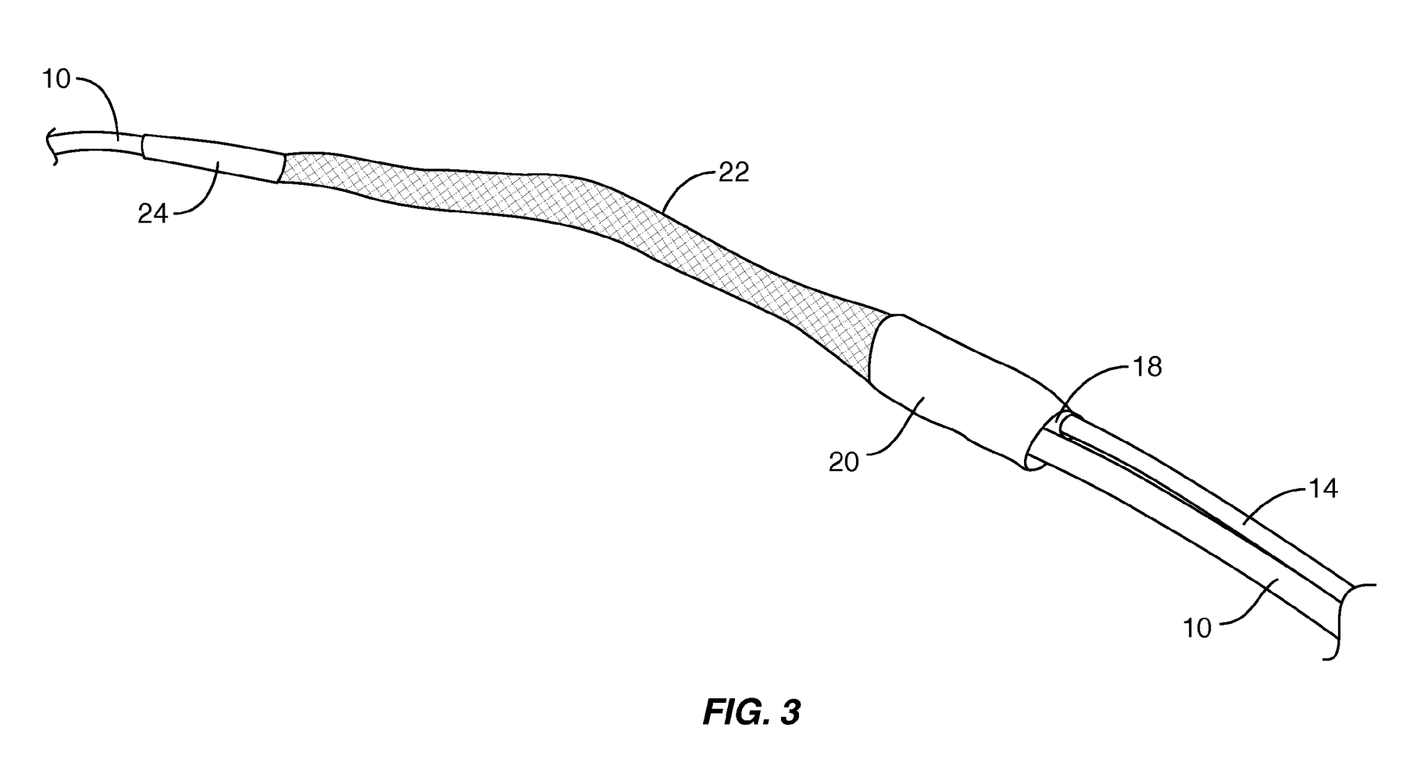
FIG. 3 is a schematic diagram of a portion of a cable assembly illustrating an attachment structure and protective covering attachment structure, according to one embodiment of the present invention.

The disclosed embodiment includes a protective covering 22 made out of an expandable nylon mesh, as illustrated in FIG. 3. The expandable mesh positioned about the optical connector 16 of the tether 14 allows the optical connector 16 to freely translate inside of the covering 22 while staying tight to the distribution cable 10. The expandable mesh further provides sufficient protection during reverse assembly pulls of the cable 10 and/or tether 14.

Figure 4A:
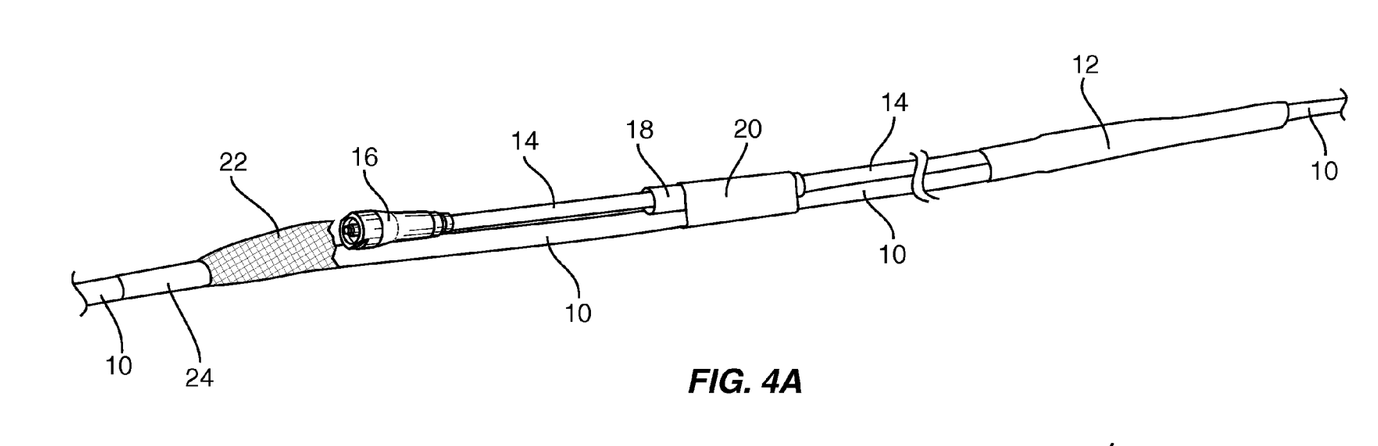
FIGS. 4A and 4B are schematic diagrams showing the slidable attachment structure of FIG. 3 and showing at least one protective covering attachment structure removed to expose the connectorized end of the tether and the at least one optical fiber connector attached thereto, according to one embodiment of the present invention.
Figure 4B:
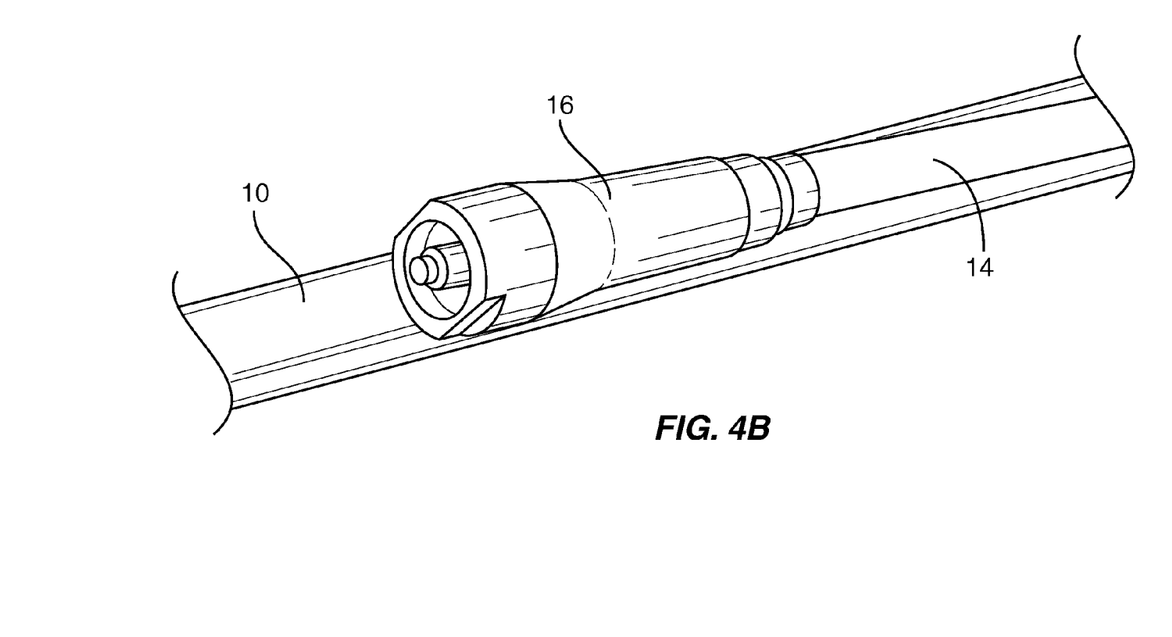

One significance of employing a protective covering 22 as an attachment structure is that it can be well suited to maintain and protect the downstream end of the tether 14 in particular. The downstream end of the tether 14 is unconnected before installation of the fiber optic cable 10, but must be accessible and freely movable during installation to provide a drop connection. The downstream end of the tether 14 generally contains an optical connector 16 or other optical connection that is accessed to provide an optical connection to the tether 14 during installation. The protective covering 22 can be cut or removed to gain access to the connector 16. An illustration of an exemplary connector 16 with the protective covering 22 removed to fully illustrate the connector 16 is illustrated in FIGS. 4A and 4B. If for example, the tubular component 18 were used as the attachment structure for the downstream end of the tether 14, the tubular component 18 would generally have to be installed below the connector 16 or other optical connection so as to not interfere with optical connection during installation. This can allow the downstream end of the tether 14, including the optical connector 16 or other optical connection, to move too freely before installation and thus damage the optical fibers. The protective covering 22 provides an internal surface area to secure the downstream end of the tether 14 to the cable 10, if desired, without requiring the downstream end of the tether 14 to be physically attached to the protective covering 22. The downstream end of the tether 14, including the optical connector 16, is contained inside the protective covering 22. Thus, the downstream end of the tether 14 can translate inside the protective cover 22 before installation. During installation, the protective cover 22 can be breached or removed to provide easy access to the downstream end of the tether 14 to establish an optical connection to the tether 14.

Another reason it can be desirable to employ a protective covering 22 on the downstream end of the tether 14 is to allow greater translation of the downstream end of the tether 14 while still maintaining the tether 14 to the cable 10 to prevent damage. It can be desirable to allow greater translation or movement to occur at the downstream end of the tether 14, because the downstream end typically contains an optical connection, such as the optical connector 16. Optical fibers in the optical connector 16 are typically more vulnerable to damage than continuous optical fibers located within the tether 14. Thus, allowing for greater translation or movement on the downstream end of the tether 14 can be more successful in preventing damage on the downstream end of the tether 14 than other attachment structures.

It should be noted that any attachment structure can be used with the present invention to maintain the tether 14 to the fiber optic cable 10. The discussion regarding possible features of employing a protective covering 22 is not a criticism of employing other attachment structures on any portion of the tether 14, including the tubular component 18, or vice versa. It is simply recognition that different attachment structure designs can have particular characteristics. The invention is not limited to any particular attachment structure or limited to placing an attachment structure on a particular portion of the tether 14. For example, either the covering 22 or the tubular component 18 can be used solely to maintain desired portions of the tether 14 to the fiber optic cable 10. Alternatively, as illustrated in figures, the protective covering 22 can be employed only on the downstream or connectorized end of the tether 14 while one or more tubular components 18 are employed along the tether 14 to secure the tether 14 to the cable 10 between the connectorized end of the tether 14 and the network access point 12.

Figure 5:
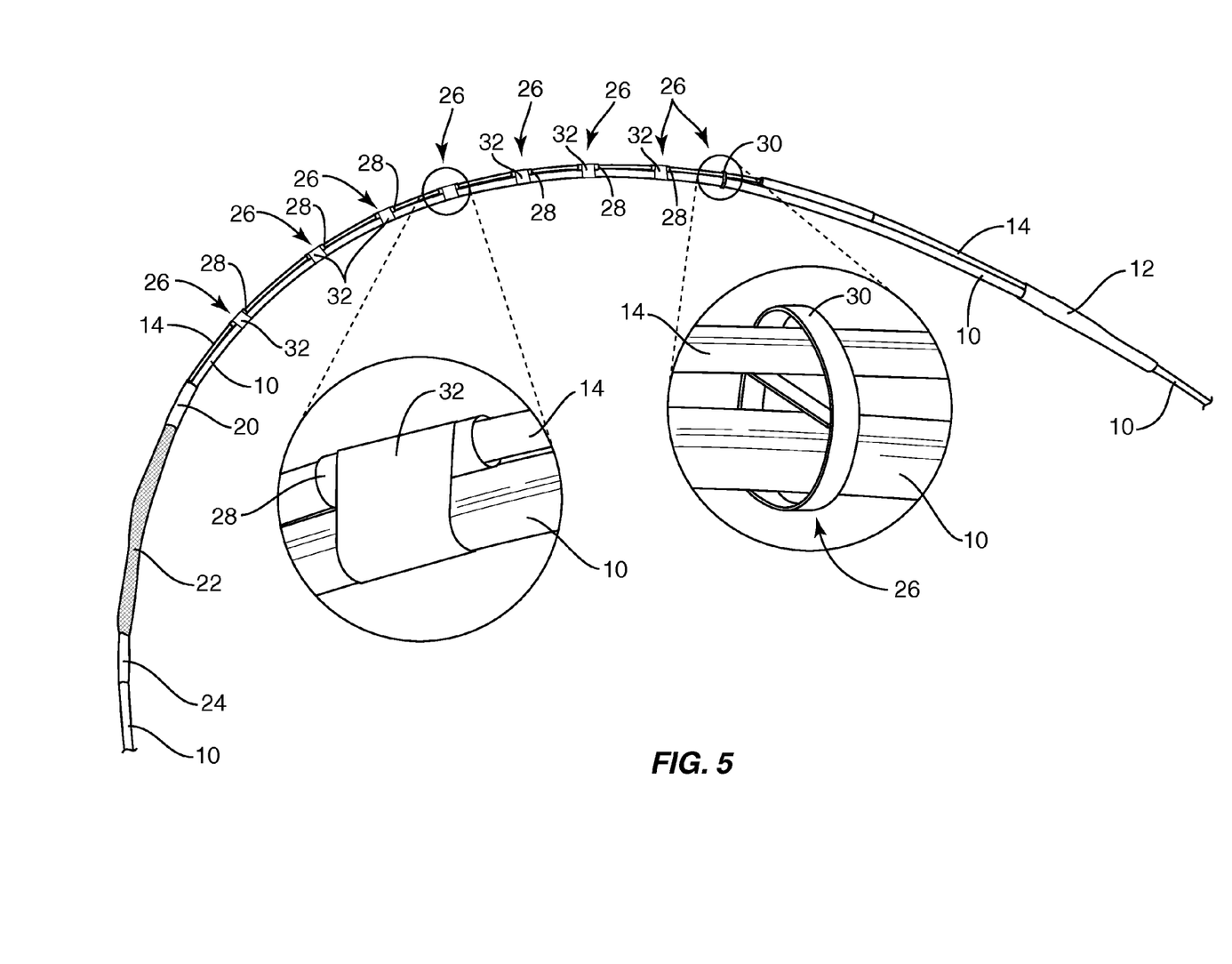
FIG. 5 is a schematic diagram detailing a portion of the distribution cable and a connectorized end of the tether and employing multiple attachment structures, according to one embodiment of the present invention.

FIG. 5 illustrates another embodiment for the attachment structure. In this embodiment, the tether 14 can be loosely maintained to the fiber optic cable 10 using multiple or additional attachment structures 26. Additional attachment structures 26 can be distributed along the fiber optic cable 10 between the network access point 12 and the downstream end of the tether 14 to maintain the tether 14 to the cable 10. Providing additional attachment structures 26 along the tether 14 can prevent certain portions of the tether 14 that would otherwise not be located adjacent an attachment structure from moving or translating beyond distances provided for in specifications and/or that can make the tether 14 more susceptible to damage. Thus, providing additional attachment structures 26 can be based on the length of the tether 14. The longer the tether 14, the more desirable it can be to include multiple attachment structures 26 to better secure the tether 14 to the fiber optic cable 10 while allowing translation of the tether 14 relative to the cable 10.

In the embodiment illustrated in FIG. 5, the additional attachment structures 26 are provided in the form of additional tubular components 28. Additionally, a plastic or polymer-based tie wrap 30 or other wrap attachment structure can also be employed as an additional attachment structure 26 to secure the tether 14 to the fiber optic cable 10 while allowing translation. The additional tubular components 28 receive the tether 14 similar to the manner in which tubular component 18 receives the tether 14. The additional tubular components 28 and/or tie wrap 30 cancan be placed along the tether 14 between the connectorized end and the network access point 12 to maintain the tether 14 to the fiber optic cable 10. In this embodiment, the additional tubular components 28 and tie wrap 30 are employed in combination with the tubular component 18 employed in the fiber optic cable 10. However, any number of components of any size or spacing can be employed to provide the additional attachment structures 26, including but not limited to one or more tubular components 18, 28, tie wraps 30, or both.

A securing device 32 can be used to secure the additional tubular components 28 to the fiber optic cable 10 similar to the manner in which the securing device 20 secures the tubular component 18 to the cable 10. The securing device 32 can be constructed and attached to the fiber optic cable 10 in all the same materials and methods as previously discussed for securing device 20. As provided with the tubular component 18, the additional tubular components 28 can include a length of tubing having an internal diameter greater than that of the cross-sectional diameter of the tether 14.

The additional tubular components 28 can be spread along the tether 14 at any spacing desired. In the illustrated embodiment in FIG. 5, the additional tubular components 28 are spaced apart at approximately two to two and one half (2-2½) inches apart. The additional tubular components 28 can each be of the same or different lengths or constructed out of the same or different materials, including those listed for the tubular component 18 previously, depending on the desires and design criteria of the cable manufacturer. The length of the tether 14 and cost factors can influence this decision. For example, it can be lest costly to employ a greater number of attachment structures each having smaller lengths to secure the tether 14 to the fiber optic cable 10. Alternatively, it can be less costly to employ a lesser number of attachment structures each having larger lengths to secure the tether 14 to the fiber optic cable 10.

The additional tubular components 28 can be smaller in length than the tubular component 18. For example, in the illustrated embodiment in FIG. 5, the additional tubular components 28 are each approximately one inch in length each, less than the length of the tubular component 18. It can be more important to provide an attachment structure adjacent the downstream end of the tether 14 or the optical connector 16 that is larger in length (such as the tubular component 18) than the attachment structures located adjacent the network access point 12 or points in between (such as the additional tubular components 28). Providing a tubular component 18 of greater length adjacent the downstream end of the tether 14 can provide greater support and resist greater translational forces that can occur on the downstream end of the tether 14 due to the mechanical advantage when the downstream end of the tether 14 is not maintained to the fiber optic cable 10.

For example, the downstream end of the tether 14, when either not maintained to the cable 10 when removed from the protective covering 22 during installation or due to a protective covering 22 or other attachment structure not being employed during manufacture of the cable 10, can be several inches or feet in length. In the illustrated embodiment of FIG. 5, the downstream end of the tether 14 with the optical connector 16 unsupported is approximately five to six inches in length. It can be important to provide additional support to the downstream end of the tether 14, because optical fibers in the optical connector 16 or other downstream splice or optical connection can be more susceptible to damage than the continuous optical fibers within the tether 14.

Alternatively, loose attachment structure can include a spring, for example, a tubular enclosure with an internal spring work. A desirable attachment structure should have a small cross-sectional diameter, for example, less than about 1.25 inches in preferred embodiments. Alternative attachment structures include integrated urethane attach point/elastic tethers. Attachment points can be releasable at the points themselves or remotely. A nose cone or other structure can be added to the connector end of the tether 14 to prevent snagging of the tether 14 and facilitate pulling of the cable 10.

Another aspect of the present invention is a method for manufacturing a cable assembly such as those exemplified in the figures and described above. The cable assembly comprises a fiber optic cable having a tether optically connected to the fiber optic cable and an attachment structure for loosely maintaining the tether to the fiber optic cable. One of ordinary skill in the art would readily appreciate and understand such method of manufacture from the discussions of the fiber optic cables 10 above. A sheath of the fiber optic cable 10 is first removed to access one or more optical fibers among a plurality of optical fibers within the section of the sheath removed from the fiber optic cable 10. The one or more optical fibers accessed from the section of the sheath removed from the fiber optic cable 10 are then terminated. The terminated optical fiber is then optically connected to an optical fiber disposed within a first end of the tether 14. The first end of the tether 14 is encapsulated to the fiber optic cable 10 to secure the first end of the tether 14 to the fiber optic cable 10. The encapsulation can comprise the network access point 12 and be constructed from the materials previously described.

In one embodiment, only a protecting covering 22 can be used as an attachment structure to secure and maintain the tether 14 to the fiber optic cable 10 while allowing the tether 14 to translate relative to the cable 10. In this embodiment, the optical connector 16 or other optical connection can be attached or made to the downstream or connectorized end of the tether 14 before the protective covering 22 attachment structure is attached. In this regard, the optical connector 16 or other optical connection is attached on a connectorized end of the tether 14 opposite the first end of the tether 14. At this point, the optical attachments are fully made such that the tether 14 can be used to establish an optical connection to one or more optical fibers within the cable 10. Thereafter, an attachment structure is placed over the tether 14 to maintain the tether 14 to the fiber optic cable 10 such that the tether 14 is able to translate relative to the fiber optic cable 10. The protective covering 22 can be positioned over the entire tether 14 and a portion of the fiber optic cable 10, or only positioned over the connectorized end of the tether 14 and a portion of the cable 10. The ends of the protective covering 22 are secured to the cable 10 via any securing means desired, including but not limited to the securing devices 20, 24 previously described. In this manner, the portion of the tether 14 within the protective covering 22 is able to move and translate relative to the cable 10.

In another method of manufacturing embodiment, an attachment structure that receives a portion of the tether 14 is used. This could include the tubular component 18 and/or additional attachment structures 26, including additional tubular components 28 or tie wraps 30, illustrated in the figures and previously described. In this embodiment, it can be desirable to install the attachment structure to the fiber optic cable 10 before the optical connector 16 or other optical connection is installed on the downstream end of the tether 14, especially if the attachment structure is such that it is to be slipped over the tether 14 and its diameter is less than any portion of the optical connector 16. Otherwise, the attachment structure can not be able to be slipped over the downstream end of the tether 14 due to the obstruction provided by the optical connector 16 or other optical connection. In this regard, the attachment structure is placed on the tether 14 before the optical connector 16 or other optical connection is attached or made to the downstream end of the tether 14. If the attachment structure is a tubular component, the component can be slipped over the downstream end of the tether 14. The attachment structure is then moved into the desired location on the tether 14 and the fiber optic cable 10, wherein it is attached to the cable 10 to maintain that portion of the tether 14 to the cable 10 while allowing such portion of the tether 14 to translate relative to the cable 10. Multiple attachment structures can be added to the tether 14 before the optical connector 16 or other optical connection is made to the downstream end of the tether 14. After the desired attachment structure(s) are employed to secure the tether 14 to the fiber optic cable 10, the optical connector 16 or other optical connection can be attached on a connectorized end of the tether 14. At this point, the optical attachments are fully made such that the tether 14 can be used to establish an optical connection to one or more optical fibers within the cable 10.

As previously discussed, both a tubular component and protective covering can be employed in combination to secure the tether 14 to the fiber optic cable 10 while still allowing the tether 14 to translate relative to the cable 10. In this manner, the method of manufacture described in the preceding paragraph of providing the tubular component attachment structures to the tether 14 and fiber optic cable 10 before the optical connector 16 or other optical connection is attached or made is applicable. After the optical connection is made, the protective covering 22 can then be added as previously described to cover the portion or portions of the tether 14 desired. Alternatively, all cover-based and non-cover based attachment structures can be added after the optical connector 16 or other connection is attached depending on the design of the tether 14 and cable 10 and the specifications and desires of the cable manufacturer.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A cable assembly, comprising:
at least one fiber optic cable;
at least one tether optically connected to the fiber optic cable at a network access point; and
an attachment structure for maintaining the tether to the fiber optic cable such that the tether is able to move relative to the fiber optic cable, wherein the attachment structure comprises at least one tubular component for receiving a portion of the tether therein so that the tether is slidably received within the at least one tubular component and a securing device for securing the at least one tubular component to the fiber optic cable.

2. The cable assembly of claim 1, wherein the attachment structure is for loosely maintaining the tether to the fiber optic cable such that the tether is constrained to translate relative to the fiber optic cable and is able to slightly twist, and have limited lateral movement during coiling and installation of the cable assembly.

3. The cable assembly of claim 1, wherein the attachment structure comprises a plurality of attachment structures located at predetermined locations on the fiber optic cable for maintaining the tether to the fiber optic cable such that the tether is able to move in a generally translational sense of direction, and slightly twist, and have limited lateral movement during coiling and installation of the cable assembly.

4. The cable assembly of claim 1, wherein the attachment structure is comprised of a structure comprised from the group consisting of tape, adhesive, wrapping, heat shrink, tie wrap, lashing, a clamp, an expandable material, a stretchable material, and an elastic material.

5. The cable assembly of claim 1, wherein the at least one tubular component is constructed out of a material comprised from the group consisting of plastic, nylon, urethane, or other polymer-based material, metal, aluminum, and ceramic.

6. The cable assembly of claim 1, wherein the securing device is comprised from the group consisting of tape, adhesive, wrapping, heat shrink, tie wrap, lashing, a clamp, an expandable material, a stretchable material, and an elastic material.

7. The cable assembly of claim 1, wherein the at least one tubular component comprises a plurality of tubular components for receiving portions of the tether therein, and wherein the securing device comprises a plurality of securing devices each for securing the plurality of tubular components to the fiber optic cable.

8. The cable assembly of claim 1, wherein the attachment structure comprises a covering positioned over the tether and a portion of the fiber optic cable.

9. The cable assembly of claim 8, wherein the covering is constructed out of a material comprised from the group consisting of a woven material, a solid material, nylon, urethane, a polymer-based material, cloth, an expandable material, a permeable material, a flexible material, a stretchable material, and a resilient material.

10. The cable assembly of claim 8, wherein the covering comprises an expandable mesh.

11. The cable assembly of claim 8, wherein the covering is positioned over either the entire tether or a portion of the tether.

12. The cable assembly of claim 8, wherein the covering is positioned over a connectorized end of the tether and a portion of the fiber optic cable to maintain the connectorized end to the fiber optic cable such that the connectorized end is able to translate relative to the fiber optic cable.

13. The cable assembly of claim 12, wherein ends of the covering are secured to the fiber optic cable to allow access to the connectorized end of the tether maintained to the fiber optic cable.

14. The cable assembly of claim 12, wherein the tubular component is adjacent a first end of the connectorized end to maintain the tether to the fiber optic cable.

15. The cable assembly of claim 14, wherein the covering is secured to the fiber optic cable via a first securing device securing an end of the covering adjacent the tubular component and the tubular component to the fiber optic cable and a second securing device securing a second end of the covering to the fiber optic cable.

16. The cable assembly of claim 1, said network access point positioned on the fiber optic cable for accessing at least one optical fiber contained in the fiber optic cable and comprising an overmolded, flexible material, and at least one optical fiber of the tether is optically connected to the fiber optic cable via the at least one optical fiber accessed through the network access point.

17. The cable assembly of claim 16, wherein the at least one optical fiber is preterminated and exits the fiber optic cable through the network access point.

18. The cable assembly of claim 16, wherein the tether is attached at a first end to the network access point to which it is optically connected to attach the tether to the fiber optic cable.

19. The cable assembly of claim 18, wherein the network access point is flexible to provide a flexible attachment of the tether to the fiber optic cable.

20. The cable assembly of claim 19, wherein the tether terminates a second end as an optical fiber connector.

* * * * *